United States Patent
Felter et al.

(10) Patent No.: US 10,896,059 B2
(45) Date of Patent: Jan. 19, 2021

(54) DYNAMICALLY ALLOCATING CACHE IN A MULTI-TENANT PROCESSING INFRASTRUCTURE

(71) Applicant: INTERNATIONAL BUSINESS MACHINES CORPORATION, Armonk, NY (US)

(72) Inventors: Wesley M. Felter, Austin, TX (US); Alexandre P. Ferreira, Austin, TX (US); Karthick Rajamani, Austin, TX (US); Juan C. Rubio, Austin, TX (US); Cong Xu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

(21) Appl. No.: 15/457,801

(22) Filed: Mar. 13, 2017

(65) Prior Publication Data
US 2018/0260330 A1    Sep. 13, 2018

(51) Int. Cl.
*G06F 9/50* (2006.01)
*G06F 12/0842* (2016.01)

(52) U.S. Cl.
CPC ............ *G06F 9/50* (2013.01); *G06F 12/0842* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 9,274,838 B2 * | 3/2016 | Bairavasundaram | G06F 9/5016 |
| 9,330,012 B2 | 5/2016 | Chockler et al. | |
| 2012/0079500 A1 * | 3/2012 | Floyd | G06F 11/3409 718/105 |
| 2016/0062904 A1 * | 3/2016 | Chockler | G06F 9/5016 711/133 |
| 2016/0112281 A1 | 4/2016 | Mason | |

OTHER PUBLICATIONS

Asaf Cidon, Dynacache: Dynamic Cloud Caching, people.csail.mit.edu, Stanford University, MIT CSAIL, 6 pages.
Summet Singh, AppFormix: Realize the Performance of Your Cloud Infrastructure, Solution Brief, Intel, 7 pages.
Peter Mell, The NIST Definition of Cloud Computing, Special Publication 800-145, National institute of Standards and Technology, U.S. Department of Commerce, 7 pages.

* cited by examiner

*Primary Examiner* — Gary W. Cygiel
(74) *Attorney, Agent, or Firm* — Fabian VanCott; Steven L. Nichols (57) ABSTRACT

Dynamically allocating cache in a multi-tenant infrastructure includes monitoring cache usage for multiple workloads in a multi-tenant processing infrastructure to determine a workload phase. A baseline performance level per workload is determined. The baseline performance level is dependent upon the workload phase. The workloads for each tenant are categorized based on cache utilization and the cache is allocated to each workload based on the baseline performance level, cache utilization, and system wide cache capacity.

20 Claims, 9 Drawing Sheets

DYNAMICALLY ALLOCATING CACHE IN A MULTI-TENANT PROCESSING INFRASTRUCTURE

BACKGROUND

The present invention relates to cache allocation, and more specifically, to dynamically allocating cache in a multi-tenant processing infrastructure. Specifically, in modern multi-tenant processing infrastructures, such as a cloud infrastructure, the sharing of resources increases system-wide performance thereby providing enhanced results to clients of the processing infrastructure. One such shard resource is cache, which is a short term, frequently accessed, memory device. While such sharing of cache resources improves cache utilization, it can interfere with performance due to competition for shared resources. Presently, cache allocation portions a part of the total available cache to different users. However, such allocation is static, meaning it is performed one time. Accordingly, if a particular tenant is not using their cache, or underutilizing the cache that has been allocated to them; this cache is unavailable to other users who may benefit from the use of the additional cache. Accordingly, the field does not resolve the problem of underutilization of cache resources.

SUMMARY

According to an embodiment of the present specification, a computer-implemented method for dynamically allocating cache in a multi-tenant processing infrastructure is described. According to the method, cache usage for multiple workloads on a multi-tenant processing infrastructure is monitored to determine a workload phase. A baseline performance level for each workload is determined, which baseline performance level is dependent upon the workload phase. The workloads of each tenant are categorized based on cache utilization and cache is allocated to each workload based on 1) the baseline performance level, 2) cache utilization, and 3) a system-wide cache capacity.

The present specification also describes a system for dynamically allocating cache in a multi-tenant processing infrastructure. The system includes a monitor engine to monitor cache usage for multiple workloads on a multi-tenant processing infrastructure to determine a workload phase. A baseline engine of the system determines a baseline performance level per workload, which baseline performance level is dependent upon the workload phase. A categorize engine categorizes workloads of each tenant based on cache utilization and an allocate engine allocates cache to each workload based on 1) the baseline performance level, 2) the cache utilization, and 3) a system-wide cache capacity.

The present specification also describes a computer program product for dynamically allocating cache in a multi-tenant processing infrastructure. The computer program product includes a computer readable storage medium having program instructions embodied therewith. The program instructions are executable by a processor to cause the processor to 1) monitor, by the processor, cache usage for multiple workloads on a multi-tenant processing infrastructure to determine a workload phase, 2) determine, by the processor, a baseline performance level per workload which is dependent upon the workload phase, 3) categorize, by the processor, workloads for each tenant based on cache utilization, and 4) allocate, by the processor, cache to each workload based on the baseline performance level, the cache utilization, and a system-wide cache capacity.

The computer-implemented method, system, and computer program product as described above, allow for dynamic cache allocation, which reduces the likelihood of underutilized or non-utilized cache while providing a baseline level of cache for each workload. Accordingly, greater utility and overall system performance is achieved by the present computer-implemented method, system, and computer program product. The inventors of the present system are the first to appreciate the existence of the afore-mentioned problem and discover the presently described solution.

Optionally, the method described above, monitoring cache usage, determining a baseline performance level, categorizing workloads, and allocating cache to each workload occurs as the cache is being accessed. In the example where these operations are carried out as the cache is being accessed, dynamic, near real-time allocation of cache is provided such that the system is more fully utilized.

Optionally, a workload may be categorized as a donor or a receiver with cache being reduced for a donor and allocated to a receiver. In an example of the computer-implemented method, system, and computer program product where the workloads are categorized in this fashion, those entities that can effectively operate on less cache continue to operate while their excess cache is passed to a receiver that would benefit from increased cache availability.

Still optionally, the allocation of cache may be based on performance isolation. In this example, different workloads continue to operate above a lower threshold based on a service level agreement or the like, without interference from other workloads that may impose a greater drain on cache resources.

Still further, the cache that is allocated may be last level cache. Accordingly, system performance is enhanced at this last level cache hierarchy to improve system performance.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As described above, processing infrastructures have dramatically enlarged their scope over the past year. Specifically, processing infrastructures, such as cloud computing infrastructures, host a variety of workloads, including websites, online transaction processing, real-time messaging, big data analytics, machine learning, and high performance computing, among other workloads can be hosted by such cloud computing resources. In these scenarios, resources are shared by the different workloads. The sharing of these resources increases utility of the resources and increases the overall effectiveness of the cloud infrastructure.

However, in multi-tenant infrastructures, resource sharing, while increasing utilization, can cause performance interference between tenants. This can occur as the different tenants compete for shared resources such as cache space, memory bandwidth, I/O bandwidth, etc. Accordingly, it is desirable to provide performance isolation for each workload. Thus ensuring a consistent and predictable minimum performance level given a workloads resource allocation. In other words, performance isolation allows one workload a certain level of performance regardless of other tenants that are operating simultaneously on the same machine. Without performance isolation, there may be interference among workloads from different tenants running on the same machine as they may be sharing the same underlying resource.

Performance isolation can be provided by providing dedicated resources to a workload. In an attempt to provide dedicated resources, some cache allocation systems assign cache to different workloads. This allocation can provide performance isolation; however, it is static, meaning such allocation does not change based on runtime behavior. Accordingly, because it is allocated statically, cache may be underutilized by one workload. This underutilized cache may otherwise be available to another workload that could benefit from it. This scenario leads to sub-optimal performance for the workload that does not have enough assigned capacity to fit the working set.

Moreover, such static allocation reduces the quantity of cache available to the various workloads. For example, presume a twelve-way cache is allocated to three workloads such that each workload is statically allocated four cache-ways. Under this allocation strategy, rather than having access to all twelve cache-ways, each workload now only has access to four cache ways, thus reducing overall cache availability of a workload.

The present specification describes a system, method, and computer program product for providing dedicated cache resources and a dynamic allocation of those cache resources. Specifically, the present system, method, and computer program product provide dedicated last level cache resources. Level 1 and level 2 caches are dedicated to each core, and the present system and method may describe the dynamic, and dedicated, allocation of last level cache (LLC).

Specifically, the present specification describes a new dynamic cache management system that provides cache isolation and performance isolation. According to the present specification, a target minimum performance level is set for each workload, irrespective of other workloads on the system and dependent just on the workload baseline performance level as defined by a service level agreement or quality of service agreement. When there is spare capacity, i.e., a workload is not utilizing its assigned cache or is underutilizing its assigned cache, a portion of the cache may be reassigned to cache-intensive workloads, i.e., workloads that could benefit from more cache.

Such a system improves the overall efficiency of cache usage by the multiple tenants utilizing a processing infrastructure. For example, if a workload is assigned a cache allocation smaller than its working set, it may suffer cache misses, which can impact performance. Cache allocations that are too large result in underutilized cache, preventing other workloads from getting as much cache capacity as they could benefit from. Accordingly, the present specification describes systems and methods that simultaneously alleviate these occurrences resulting in higher performance for workloads that can use more cache capacity when others are not utilizing their assigned cache. Specifically, cache capacity can be redirected form one workload to another to effectuate greater overall cache utilization. Such a method operates based on runtime behavior and allocates cache to those workloads that could benefit therefrom, while still guaranteeing that all workloads get at least their baseline performance level.

Specifically, according to the present systems and methods, workload characteristics are monitored to understand in real-time what impact an increase/decrease in cache capacity allocated to the workload has. The distribution of cache can then be dynamically altered among the workloads accordingly. In this example, cache capacity is maintained for each workload such that a minimum baseline performance level is maintained, which minimum baseline performance level is proportional to the number of cores a workload is entitled. The categorization and allocation provides at least a baseline performance for all workloads and improves the performance for cache-starved workloads when other workloads can get by with less, thus resulting in better utilization of the cache.

In summary, such a dynamic cache allocation system 1) guarantees a baseline performance for each workload; 2) increases performance by increasing utilization of underutilized cache; 3) increases cache available to workloads over a static allocation system; and 4) increases utilization by allocating cache dynamically based on runtime behavior, i.e., as cache is accessed. However, it is contemplated that the devices disclosed herein may address other matters and deficiencies in a number of technical areas.

As used in the present specification and in the appended claims, the term "tenant" refers to a user of a processing infrastructure, such as a cloud, that is running workload(s) within the processing infrastructure.

Further, as used in the present specification and in the appended claims, the term "workload" refers to an application, or set of operations carried out by a tenant. It may also apply to a virtual machine (VM), a container or a collection of workloads run by a tenant.

Even further, as used in the present specification and in the appended claims, the term "a number of" or similar language is meant to be understood broadly as any positive number including 1 to infinity.

Figure 1:
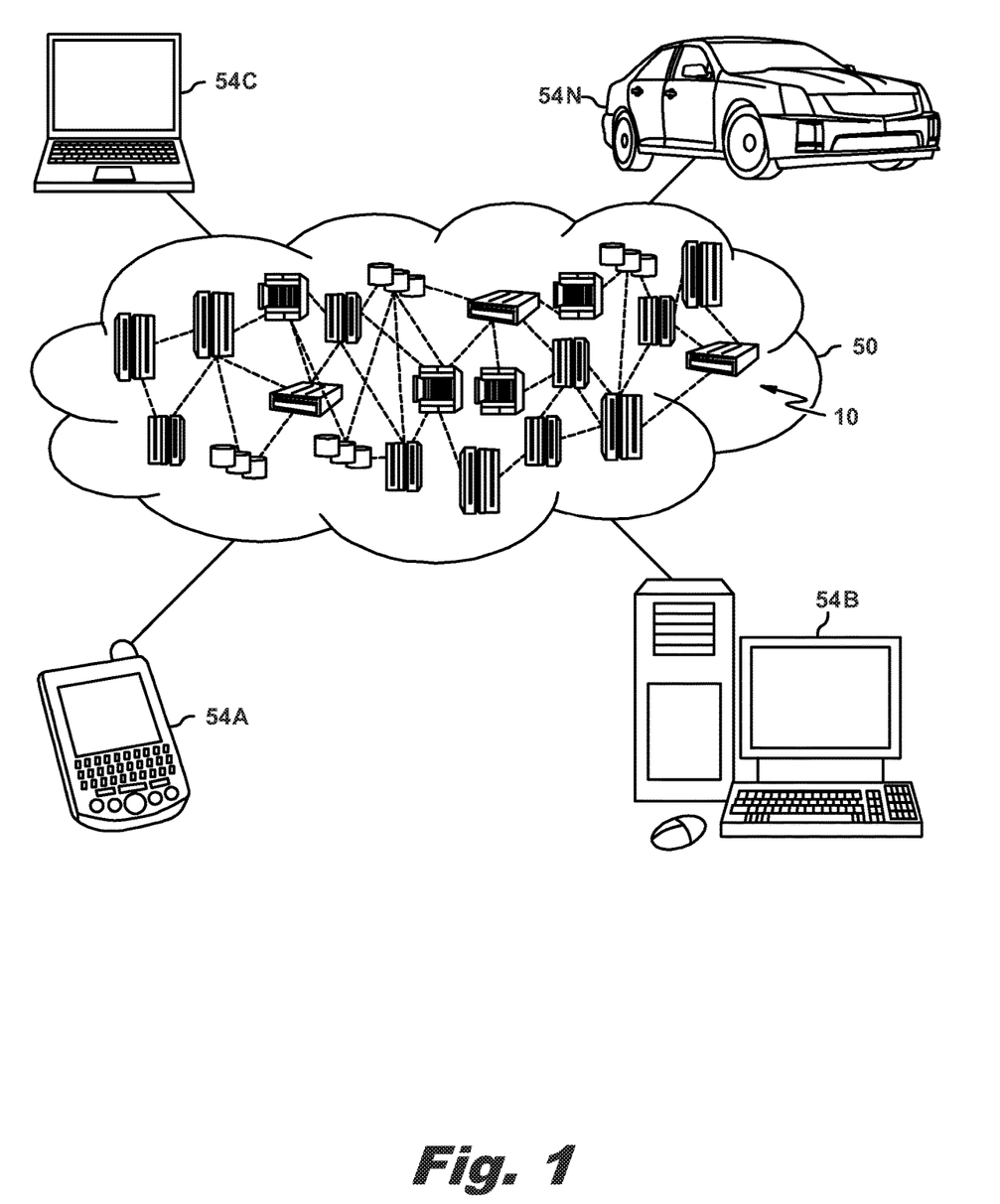
FIG. 1 depicts a cloud computing environment, according to an example of principles described herein.

Referring now to the figures, FIG. 1 depicts a cloud computing environment (50), according to an example of principles described herein. As shown, a cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows the cloud computing environment (50) to offer infrastructure, platforms and/or software as services for which a cloud consumer does not need to maintain resources on a local computing device. It is understood that the types of computing devices 54A-N shown in FIG. 1 are intended to be illustrative only and that computing nodes (10) and cloud computing environment (50) can communicate with any type of computerized device over any type of network and/or network addressable connection (e.g., using a web browser).

Figure 2:
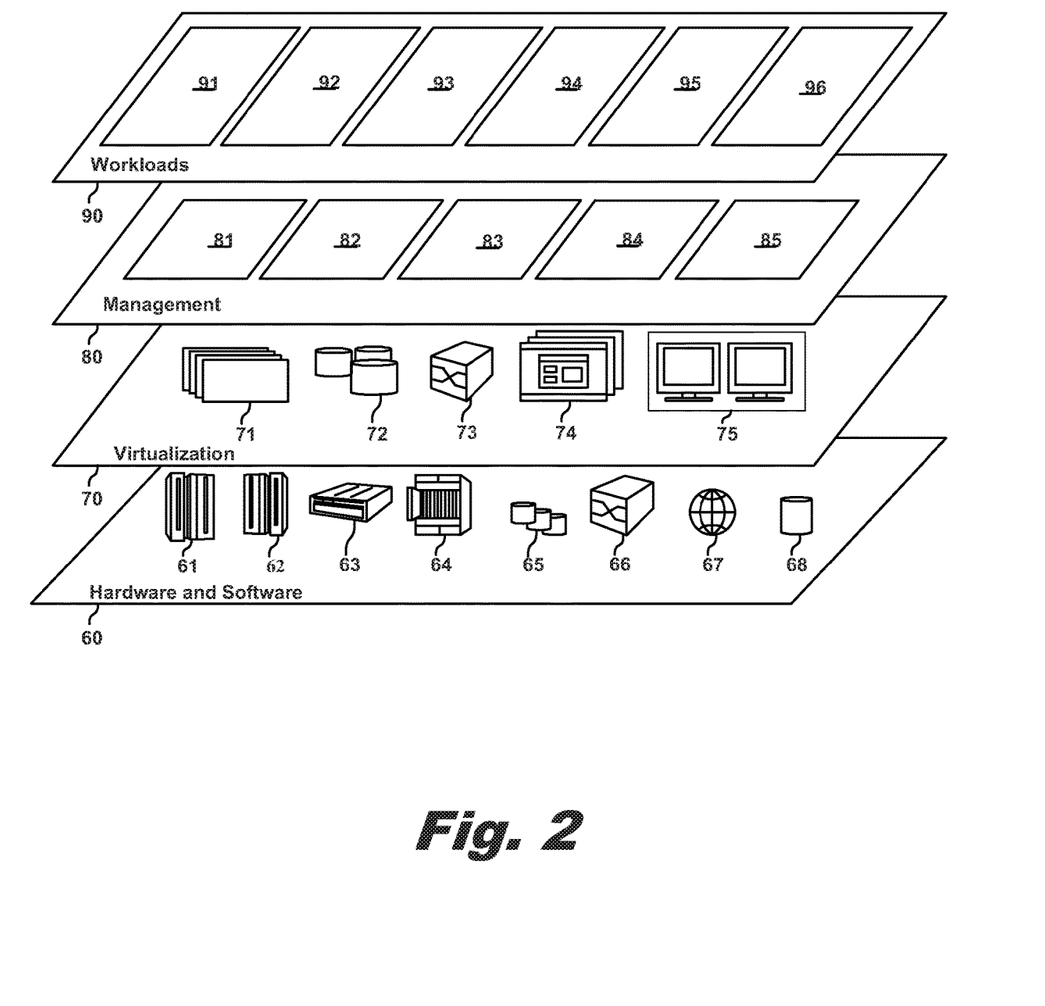
FIG. 2 depicts abstraction model layers, according to an example of the principles described herein.

FIG. 2 depicts abstract model layers provided by the cloud computing environment (FIG. 1, 50), according to an example of principles described herein. It should be understood in advance that the components, layers, and functions shown in FIG. 2 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment (85) provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and cache allocation (96).

Figure 3:
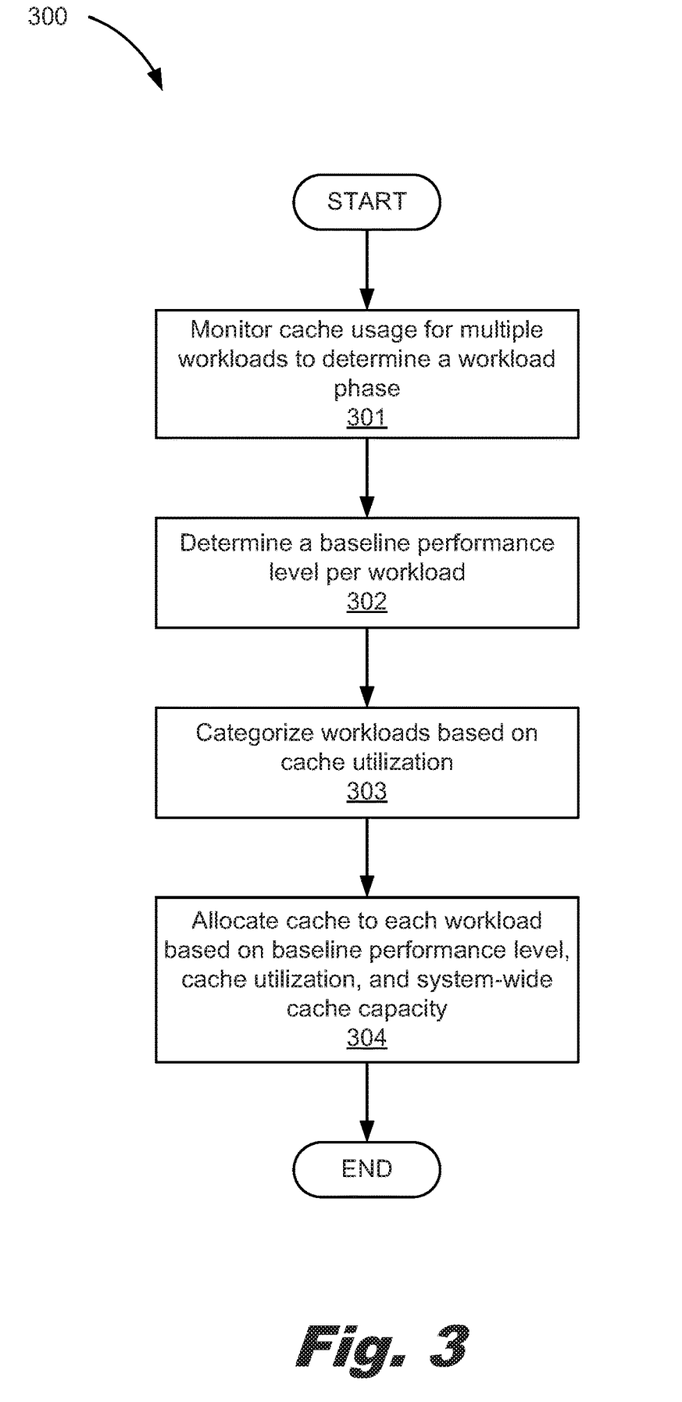
FIG. 3 depicts a flowchart of a method for dynamically allocating cache in a multi-tenant processing infrastructure, according to an example of principles described herein.

FIG. 3 depicts a flowchart of a method (300) for dynamically allocating cache in a multi-tenant processing infrastructure, according to an example of principles described herein. The multi-tenant processing infrastructure may enable unilaterally provisioning computing capabilities in a cloud environment.

According to the method (300), cache usage for multiple workloads on a multi-tenant processing infrastructure is monitored (block 301) to determine a workload phase. As used in the present specification, the "phase" of a workload refers to a period of time when there is consistent cache operations or consumption of cache for a processing core. Accordingly, the phase may change as a different workload is executed, or as an existing workload changes its behavior over time.

Monitoring (block 301) cache usage may include monitoring cache data such as cache references, cache hits, and cache misses for each of the multiple workloads. From this data, a number of memory accesses per instruction can be determined. Memory access per instruction may be a reliable indicator of cache usage and performance. Specifically, a monitoring engine can monitor the number of L1 cache references made by all cores assigned to a workload. Such references may come in the form of LOAD instructions and STORE instructions issued by the workload. The monitoring engine can also monitor the number of instructions executed by all cores assigned to a workload. Using these values, the monitoring engine can determine the number of memory accesses per instruction, and from the number of memory accesses per instruction, determine the workload phase. Specifically, a ratio of a number of memory accesses per retired instruction can indicate the workload phase. If the ratio stays within a predetermined range, which range may be a configurable parameter, then it may be determined that the phase change has not occurred. By comparison, if the ratio is outside the predetermined range, it can be determined there has been a phase change and a performance table flushed. The phase detection can be calculated from a set of cores. This is because it may be difficult to acquire information of tenants' workloads in the cloud (e.g. applications running inside a virtual machine) and it is simpler to measure the overall characteristics of a set of cores which host the virtual machine or workloads.

While one specific method of determining cache usage is described herein, many other forms of monitoring cache usage to determine a phase for a workload may also be implemented. The behavior of a workload may change based on the phase. Accordingly, by updating baseline information based on a change in phase, it can be assured that a baseline performance level is met for a particular phase.

Monitoring (block 301) cache usage to determine a workload phase ensures that any allocation of cache meets a baseline performance level for a workload regardless of the phase of the workload. More specifically, the baseline performance level is dependent upon a phase of the workload. Put yet another way, workloads in different phases can behave very differently in terms of their cache needs. That is, the baseline performance level may be affected differently by different intensities of the workload, i.e., different phases. Accordingly, by monitoring (block 301) cache usage to determine a workload phase, it can later be ensured that the baseline performance level is ensured when a workload is operating within that phase.

With the workload phase determined, a baseline performance level for each workload can be determined (block 302). That is the baseline performance level is dependent upon the previously determined workload phase. For example, as described above different workloads have different cache sensitivities so their baseline performance under the same cache allocation may be different. Accordingly, by determining, through a baseline engine of the system, a baseline performance level based on the phase maximizes the system throughput while still guaranteeing the baseline performance of all users' workloads.

In general, the baseline performance level refers to a performance level assured to each workload based on an arrangement with the tenant. For example, a service level agreement or quality of service agreement may indicate that a baseline level of cache is to be provided within the processing infrastructure, i.e., the cloud infrastructure. The baseline performance level can be determined (block 302) as a measure of instructions per cycle when the workload is operating with the baseline cache amount that the tenant has explicitly reserved. As a specific example, a baseline engine may determine the baseline performance level by multiplying the total number of cores for a tenant with the total number of cache ways. By determining a baseline performance level, it can be assured that the resources allocated to a particular workload never fall below a predetermined level. For example, if a user purchases a certain amount of cache resources, it can be assured, that when needed, the user has access to at least that amount of cache resources.

With this baseline performance level determined (block 302), the workloads can be categorized (block 303) based on cache utilization. That is, it can be determined 1) which cache allocations are being underutilized or over utilized, 2) which workloads could benefit from an increased amount of cache, and/or 3) which workloads would not be harmed by a decreased amount of cache. The workloads may be categorized (block 303) into any number of groups. For example, each workload may be classified as a donor, a receiver, a keeper, and unknown. In general, a donor workload is one from which cache resources are drawn away from, a receiver workload is one to which cache resources are allocated, a keeper workload is one that is to maintain a current level of cache, and an unknown workload is one where additional information is needed to determine whether the workload is a donor, receiver, or keeper. In another example, a donor is a workload that does not suffer if cache is reduced and also does not benefit from more cache, a receiver is a workload that benefits from more cache and suffers with less cache, a keeper is a workload that would suffer if less cache were available, but does not benefit from more, and an unknown workload is one for which no determination can be made using the current information.

In some examples, all workloads are initially categorized as a keeper, and after collecting statistics, the workloads may be re-classified as a donor, receiver, keeper, or unknown workload. In categorizing the different workloads, different statistics regarding attempts to access cache can be collected periodically. Examples of such statistics include a L1 cache reference value that records to the total L1 references of all cores assigned to a workload, a LLC reference value that records the total LLC references for all cores assigned to a workload, a LLC cache miss value that records the total LLC cache misses suffered by a workload, and a LLC cache miss rate which can be calculated by dividing the LLC cache miss value by the LLC reference value. Another example of a collected statistic is the LLC capacity value, which records the size of the LLC consumed by a workload.

From this collected information, a category of the workload can be set. The criteria by which a workload is grouped into a category are varying. For example, a donor may simply be defined as a workload with a low LLC reference value, a receiver may be defined as a workload with a high LLC reference value, and an unknown workload may be defined as a workload with a high LLC reference value. The unknown workload may be later classified as a donor when it is determined that the unknown workload in addition to having a high LLC reference value also has a low LLC cache miss rate. The unknown workload may be later classified as a receiver when it is determined that the unknown workload in addition to having a high LLC cache reference value also has a high LLC cache miss rate.

In determining whether an LLC reference value or LLC cache miss rate is high or low for a particular workload, an engine, such as the categorize engine, may compare the LLC reference value and LLC cache miss rate to threshold values. The threshold values may be predetermined and user-defined according to different needs and characteristics of the processing infrastructure. The above-described categorization of the different workloads allows for efficient allocation of cache resources to the various workloads executing in a cloud infrastructure.

After the workloads have been categorized (block 303), the cache is allocated (block 304) among the varying workloads. Specifically, the allocation is based on the baseline performance level, cache utilization, and a system-wide cache capacity. That is, allocation is carried out such that cache is drawn away from donors and passed to receivers. However, the amount of cache drawn from a donor is limited by the baseline cache such that the baseline performance level does not drop below the baseline performance level as defined by any service level agreement or quality of service agreement.

Optionally, the allocation (block 304) of cache to the varying workloads may conform to any number of allocation policies. Examples of various allocation policies include a maximum system performance policy and a maximum beneficiary policy. For example, if multiple workloads benefit from larger caches, varying policies may dictate how the cache is allocated. According to a maximum system performance policy, cache is allocated to benefit overall system performance, which may result in disproportionate dispersal of available cache. In this scenario, the system described herein may reference a performance table that includes all the performance and metrics collected per workload phase and size. That is, the performance table records cache allocation history that equates cache allocations with a corresponding performance. Thus, in allocating based on a maximum system performance policy, the system analyzes the performance table for the particular phase to find a combination of cache allocations whose sum of the normalized instructions per cycle of all workloads is the largest. Allocating (block 304) cache based on a maximum system performance ensures that the greatest overall increase in system performance is achieved.

Using a maximum beneficiary policy, cache may be allocated such that the greatest number of workloads increase performance. In this example, a performance table may be ignored and the system evenly distributes the available cash regardless of any performance improvement. Allocating (block 304) cache based on a maximum system beneficiary policy ensures that each workload increases performance to some degree.

Optionally, monitoring the cache usage, determining a baseline performance level, categorizing workloads, and allocating cache to each workload occurs based on runtime behavior, that is, the operations are carried out as cache is being accessed. Doing so ensures that cache allocation is continually updated based on the changing needs of the workloads over time.

By dynamically allocating cache real-time, the problem of the inefficiencies of a static partitioning system are resolved. Specifically, there is less underutilization of cache resources. All this is done while ensuring that minimum performance levels are observed for the tenants.

Figure 4A:
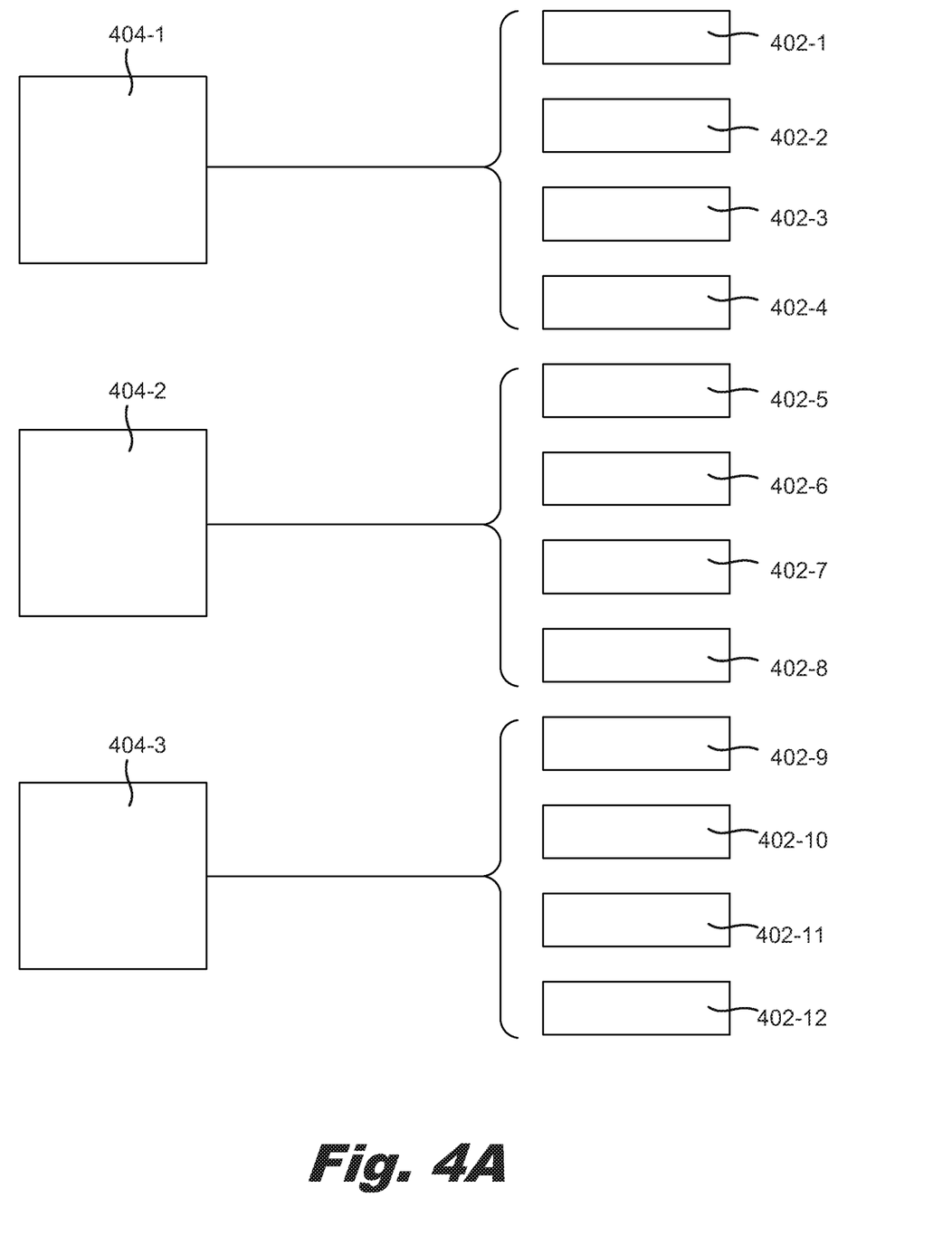
FIGS. 4a and 4b depict the dynamic allocation of cache in a multi-tenant processing infrastructure, according to an example of principles described herein.
Figure 4B:
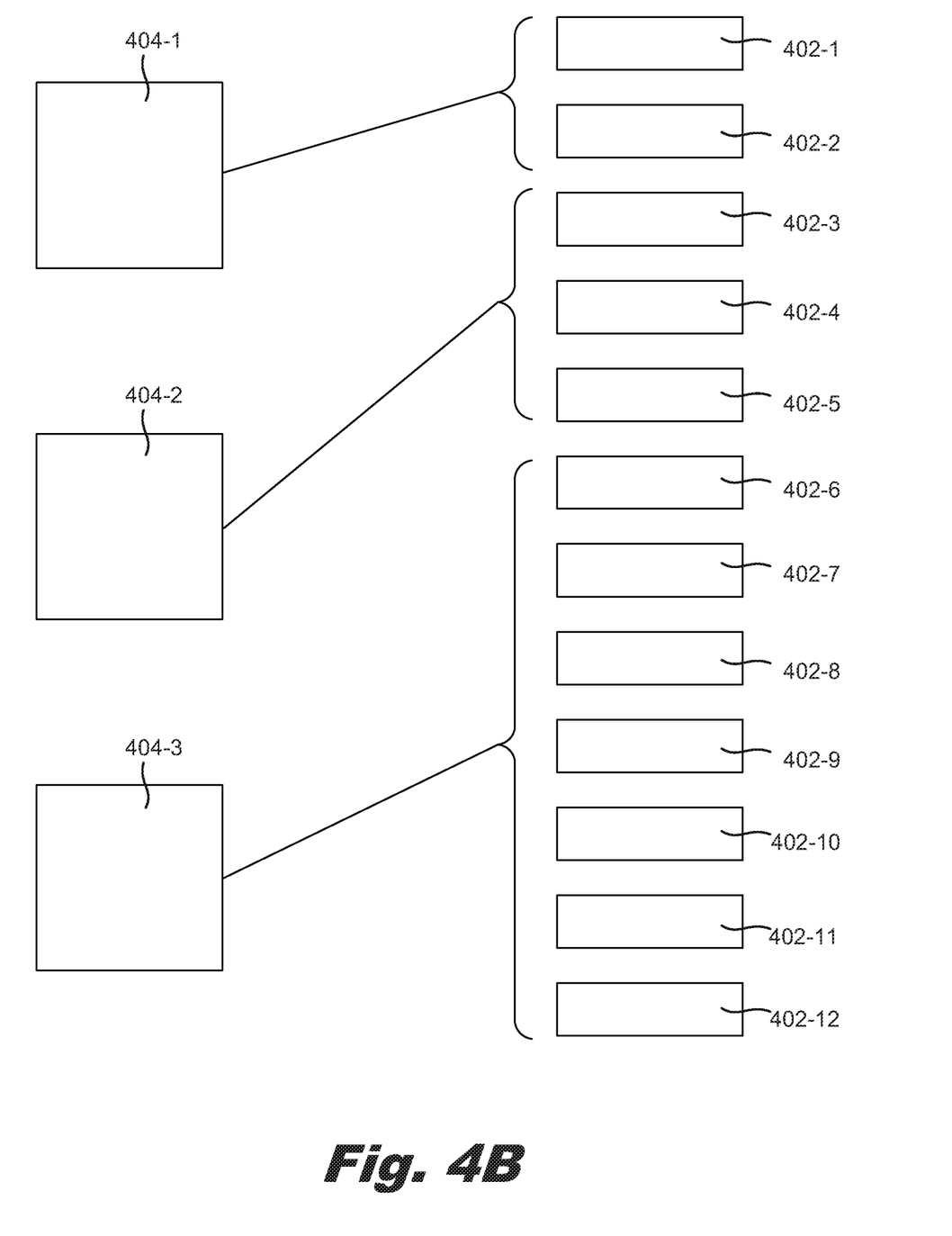

FIGS. 4a and 4b depict the dynamic allocation of cache in a multi-tenant processing infrastructure, according to an example of principles described herein. In FIGS. 4a and 4b, cache is divided into cache ways (402) which are allocated to different workloads (404). Note that FIGS. 4a and 4b are functional diagrams and the shapes depicted therein are merely representational. In the example depicted in FIG. 4a, twelve cache ways are allocated to each of three workloads. Specifically, a first workload (404-1) is allocated four cache ways (402-1, 402-2, 402-3, 404-4), a second workload (404-2) is allocated four cache ways (404-5, 404-6, 404-7, 404-8), and a third workload (404-3) is allocated four cache ways (404-9, 404-10, 404-11, 404-12). In this example, the base cache for each workload (404) may be two cache ways (404) as defined by a service level agreement.

FIG. 4a depicts an initial state when each workload (404) is assigned a predetermined number of cache ways, i.e., a predetermined cache level. In some examples, the cache allocation may be reset to this predetermined level once a phase change has occurred.

As depicted in FIG. 4b, in some point in time, it is determined that the first workload (404-1) and the second workload (404-2) are underutilizing their available cache, and that the third workload (404-3) would benefit from increased cache. This may be done as described above by monitoring, and evaluating, the cache references and the cache miss rates of the different workloads. In this example, the first workload (404-1) and the second workload (404-2) may be designated as donors and the third workload (404-3) may be designate as a receiver. Accordingly, as depicted in FIG. 4b, the cache ways (402) may be reallocated such that the third workload (404-3) has access to more cache ways (402) and the first workload (404-1) and the second workload (404-2) have fewer cache ways (402). Note that in this example, neither of the first workload (404-1) and the second workload (404-2) have fewer cache ways than their baseline performance level, allows, i.e., two cache ways (402).

Figure 5:
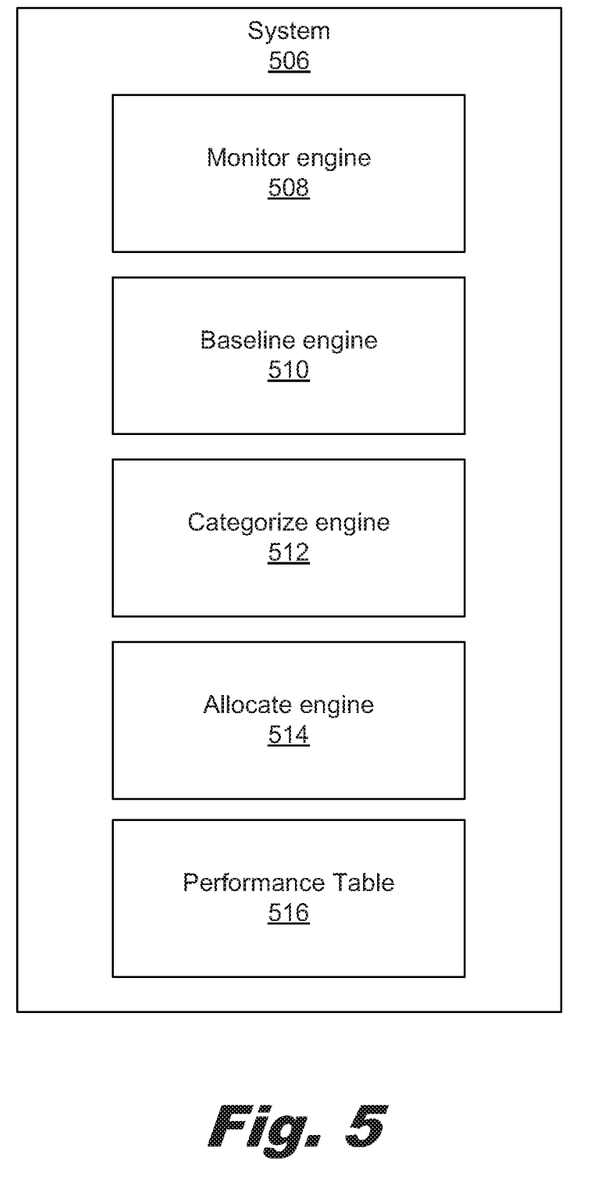
FIG. 5 depicts a system for dynamically allocating cache in a multi-tenant processing infrastructure, according to an example of principles described herein.

FIG. 5 depicts a system (506) for dynamically allocating cache in a multi-tenant processing infrastructure, according to an example of principles described herein. To achieve its desired functionality, the system (506) includes various engines. The engines refer to a combination of hardware and program instructions to perform a designated function. The engines may be hardware. For example, the engines may be implemented in the form of electronic circuitry (e.g., hardware). Each of the engines may include a processor to execute the designated function of the engine. Each of the modules may include its own processor, but one processor may be used by all the engines. For example, each of the engines may include a processor and memory. Alternatively, one processor may execute the designated function of each of the modules.

The monitor engine (508) monitors cache usage for multiple workloads on a multi-tenant processing infrastructure such as a cloud infrastructure. Specifically, the monitor engine (508) may monitor last level cache usage. Monitoring last level cache usage is advantageous in that it is a form of cache that is typically shared amongst several tenants as opposed to L1 and L2 cache, which may be core-specific.

As described above, the monitor engine (508) collects information such as cache references and cache misses to determine a phase for a workload, which phase is defined by an instructions per cycle value. This value can then be used by the baseline engine (510) to determine a baseline performance level for the workload. As described above, a baseline performance level for a workload alters depending on the phase as different phase effect cache in different ways.

A categorize engine (512) can then categorize the different workloads based on the cache utilization of each. For example, as described above, the categorize engine can rely on the statistics gathered regarding cache references and cache misses per workload to categorize the workload as a donor, a receiver, a keeper, or an unknown workload. Based on this categorization, and also based on the baseline performance level, and a system-wide cache capacity, the allocate engine (514) allocates the cache among the various workloads.

Figure 7:
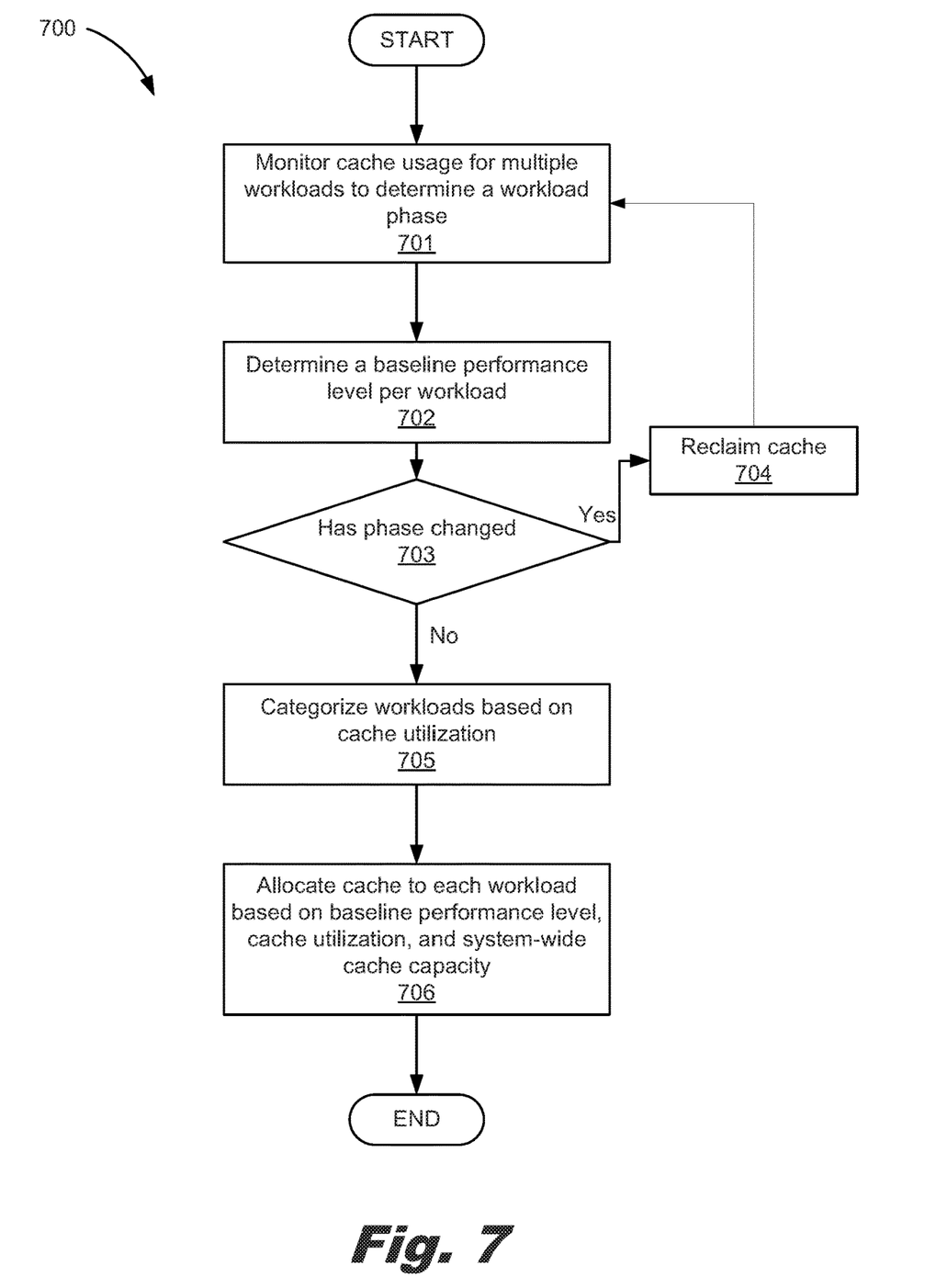
FIG. 7 depicts a flowchart of a method for dynamically allocating cache in a multi-tenant processing infrastructure, according to an example of principles described herein.

In some examples, the system includes a performance table (516) from which an allocation of cache can be made. That is, in some examples, as depicted in FIG. 7 below, cache allocation may be based on an iterative process wherein cache is allocated one cache way at a time until certain criteria are met. In this example, a performance table (516) may not be necessary. However, in another example, a performance table (516) may allow for expedited cache allocation. An example performance table (516) is provided below.

TABLE (1)

| Cache-ways | Normalized IPC | Mark |
| --- | --- | --- |
| 1 | N/A | |
| 2 | 0.9 | |
| 3 | 1.0 | baseline |
| 4 | 1.15 | |
| 5 | 1.25 | |
| 6 | 1.3 | preferred |
| 7 | 1.3 | |
| 8 | 1.3 | |

As indicated in Table (1), a baseline performance level is indicated at 3 cache ways. In this example, the performance table (516) indicates a performance history. That is, the performance table (516) indicates a performance, as indicated in instructions-per-cycle for various number of cache ways. Note that the performance table (516) is on a per-phase basis. That is, the system (506) may include a number of performance tables (516), each corresponding to a different phase. Accordingly, when a phase level is detected, and a status of a workload is determined, it can be readily assessed how many cache ways can be taken from, or passed to, the particular workload. Doing so can reduce the time of allocating cache to fit the different working sets, thus improving the overall performance of the system.

As the performance table (516) includes instructions-per-cycle for a given phase, the performance table (516) can also be used by the monitor engine (508) to determine a phase change.

The categorize engine (512) categorizes the different workloads. For example, as described above, a workload may be identified as a donor when it has an LLC reference value less than the LLC reference threshold. In another example, a workload may be identified as a donor when a workload has an LLC reference value greater than the LLC reference threshold, but has no LLC cache misses. In another example, a workload may be identified as a donor when 1) the workload has an LLC reference value greater than the LLC reference threshold, 2) has a LLC miss rate greater than the LLC miss threshold, 3) would not achieve better performance after getting more cache, and 4) would not lose performance after losing cache. In this example, the last criteria could be determined using the performance tables (516).

By comparison, a workload may be defined as a receiver when it 1) has an LLC reference rate greater than the LLC reference threshold, 2) has an LLC miss rate greater than the miss rate threshold, and 3) would perform better were more cache available. Again, this last bit of information could be collected by consulting the information in the performance table (516). For example, it could be determined that going from 4-5 cache ways would improve the performance of a particular workload based on the instructions per cycle from Table (1). Accordingly, this particular workload would be noted a receiver. By comparison, it could be determined that a workload having 6 cache ways does not improve performance by going to 7 cache ways, thus it would not be designated as a receiver. Accordingly, such a performance table (516) aids in the efficient allocation of cache by quickly determining how much cache can be allocated without affecting workload performance.

By dynamically allocating cache real-time, the problem of the inefficiencies of a static partitioning system are resolved. Specifically, there is less underutilization of cache resources. All this is done while ensuring that minimum performance levels are observed for the tenants.

Figure 6:
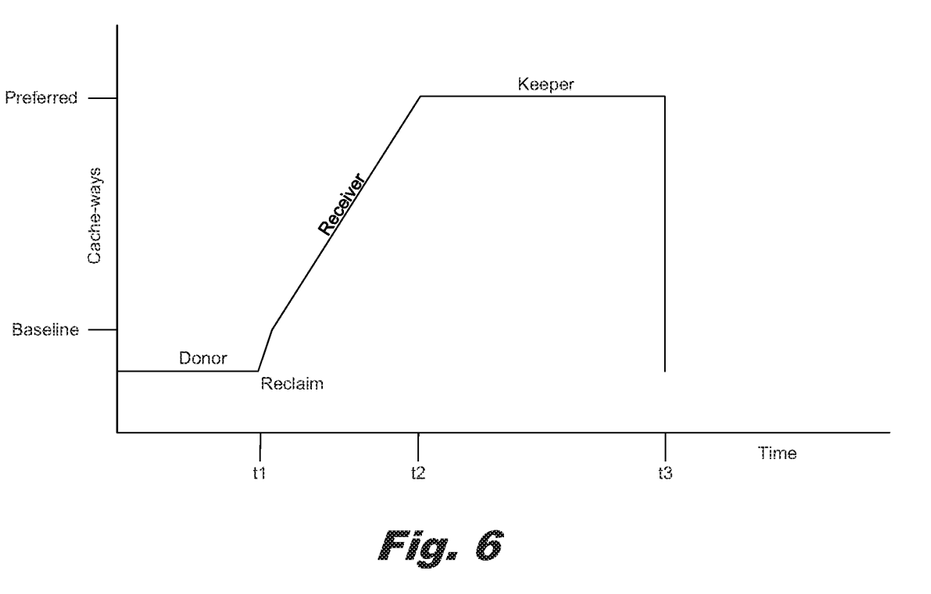
FIG. 6 depicts a dynamic allocation of cache for a workload, according to an example of principles described herein.

FIG. 6 depicts a dynamic allocation of cache for a workload, according to an example of principles described herein. As described above, in some cases the allocation of cache to a receiver is performed iteratively until certain criteria are met. FIG. 6 is an example of such a procedure. As depicted in FIG. 6, initially, the workload is underutilizing its assigned cache and therefore is categorized as a donor. In this example, the rest of the cache allocated to the workload can be used by other workloads. At time t1, the workload starts a memory-intensive phase, which change in phase triggers reclamation of the reserved cache size for the workload to the workload. In this memory-intensive phase, the baseline cache cannot fit the working set, thus resulting in an LLC cache miss rate that is greater than the LLC cache miss rate threshold. Accordingly, if there is available cache in the resource pool, the workload cache size is increased by one, for each iteration until time t2, when the LLC cache miss rate for the workload is smaller than the threshold and the instructions per cycle is not improved any more. At time t3, the workload stops running, so it again becomes a donor due to the low number of LLC references.

FIG. 7 depicts a flowchart of a method (700) for dynamically allocating cache in a multi-tenant processing infrastructure, according to an example of principles described herein. According to the method (700), cache usage is monitored (block 701) to determine a workload phase and a baseline performance level per workload for the phase is determined (block 702). These operations may be performed as described above in connection with FIG. 3. After a baseline performance has been determined (block 702) it may be determined (block 703) if there has been a phase change. If there has been a phase change (block 703, determination YES), the cache may be reclaimed (block 704). In this example, the method (700) returns to determining a phase and determining a corresponding baseline level. Doing so ensures that a correct baseline performance level is indicated as each baseline performance level is based on the particular phase, and a change in phase renders any baseline performance level determination invalid.

If a phase change has not occurred (block 703, determination NO), the workloads may be categorized (block 705) and the cache can be allocated (block 706) as described above in regards to FIG. 3. In some examples, the method (700) may be carried out periodically. That is, once a predetermined period of time has elapsed, the method (700) may be carried out another time to determine a proper cache allocation.

Figure 8:
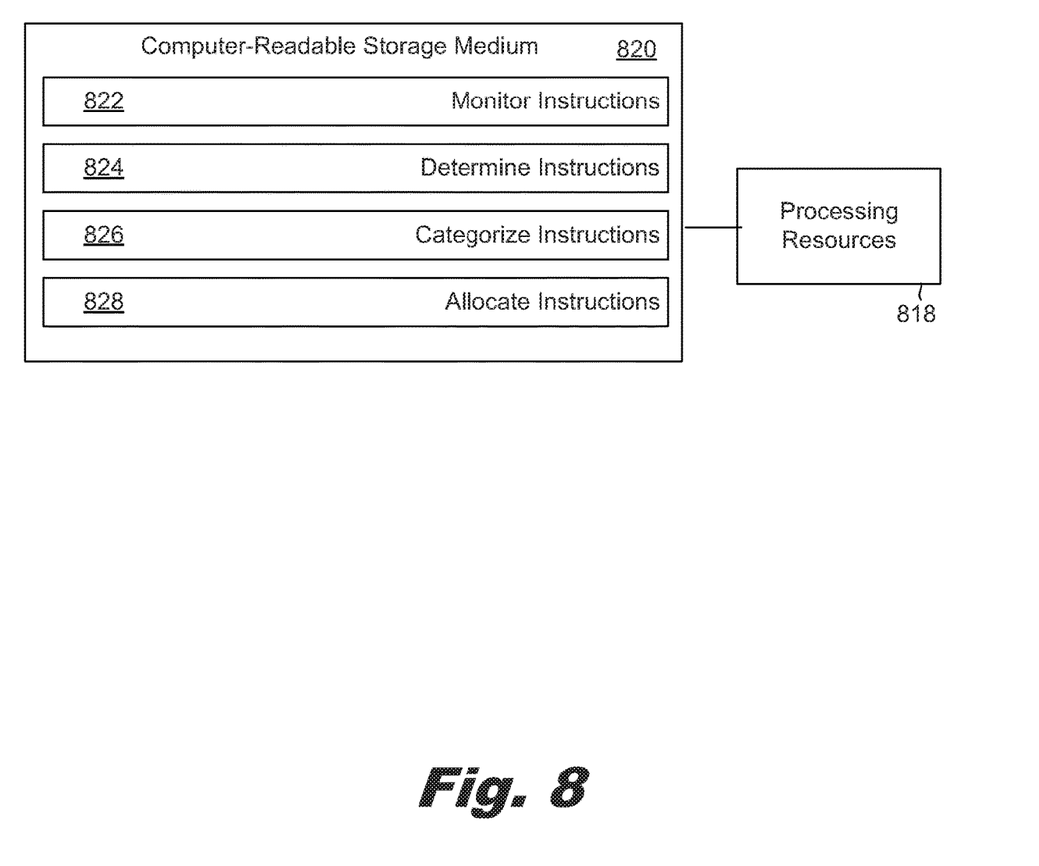
FIG. 8 depicts a computer readable storage medium for dynamically allocating cache in a multi-tenant processing infrastructure, according to an example of principles described herein.

FIG. 8 depicts a computer readable storage medium (820) for dynamically allocating cache in a multi-tenant processing infrastructure, according to an example of principles described herein. To achieve its desired functionality, a computing system includes various hardware components. Specifically, a computing system includes processing resources (818) and a computer-readable storage medium (820). The computer-readable storage medium (820) is communicatively coupled to the processing resources (818). The computer-readable storage medium (820) includes a number of instructions (822, 824, 826, 828) for performing a designated function. The computer-readable storage medium (820) causes the processing resources (818) to execute the designated function of the instructions (822, 824, 826, 828).

Referring to FIG. 8, monitor instructions (822), when executed by the processing resources, cause the processor (818) to monitor cache usage for multiple workloads on a multi-tenant processing infrastructure to determine a workload phase. Determine instructions (824), when executed by the processor (818), may cause the processor (818) to determine a baseline performance level per workload based on the workload phase. Categorize instructions (826), when executed by the processor (818), may cause the processor (818) to categorize workloads of each tenant based on cache utilization. Allocate instructions (828), when executed by the processor (818), may cause the processor (818) to allocate cache to each workload based on the baseline performance level, cache utilization, and system wide cache capacity. In some examples, the program instructions are provided as a service in a cloud environment.

In summary, such a dynamic cache allocation system 1) guarantees a baseline performance for each workload; 2) increases performance by increasing utilization of underutilized cache; 3) increases cache available to workloads over a static allocation system; and 4) increases utilization by allocating cache dynamically based on runtime behavior, i.e., as cache is accessed. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring memory accesses per instruction for multiple workloads on a multi-tenant processing infrastructure to determine a workload phase based on the memory accesses per instruction;
   from a performance table which includes performance history specific to the workload phase, determining a baseline performance level per workload, which baseline performance level is dependent upon the workload phase;
   categorizing workloads of each tenant based on:
     cache utilization; and
     extracted information from the performance table whether performance for the workload, as indicated in instructions-per-cycle, would increase for the workload phase were more cache available; and
   allocating cache to each workload based on the baseline performance level, cache utilization, and system wide cache capacity.

2. The computer-implemented method of claim 1, wherein the multi-tenant processing infrastructure enables unilaterally provisioning computing capabilities in a cloud environment.

3. The computer-implemented method of claim 1, wherein monitoring cache usage, determining a baseline performance level, categorizing workloads, and allocating cache to each workload occurs as the cache is being accessed.

4. The computer-implemented method of claim 1, wherein monitoring cache usage for multiple workloads comprises monitoring cache references, cache hits, and cache misses for each of the multiple workloads.

5. The computer-implemented method of claim 1, wherein the baseline performance level per workload is guaranteed at any time.

6. The computer-implemented method of claim 5, wherein:
   a workload is a donor upon the satisfaction of at least one criteria selected from the group consisting of:
     a workload has a cache reference rate less than a reference rate threshold;
     a workload has a cache reference rate greater than the reference rate threshold and does not perform worse after reducing cache; and
   an entity is receiver when a workload has a cache reference rate greater than the reference rate threshold, a cache miss rate greater than the miss rate threshold and performs better after receiving more cache.

7. The computer-implemented method of claim 6, wherein:

an unknown entity is classified as a receiver when performance increases after receiving additional cache; and an unknown entity is classified as a donor when performance does not increase after receiving additional cache.

8. The computer-implemented method of claim 6, wherein allocating cache to a receiver comprises iteratively increasing cache to a receiver until a cache miss rate falls below the cache rate threshold value.

9. The computer-implemented method of claim 1, wherein each workload is classified as one entity selected from the group consisting of a donor, a receiver, a keeper, and unknown.

10. The computer-implemented method of claim 9, further comprising:
reducing allocation of cache ways for each workload classified as a donor; and
increasing allocation of cache ways for each workload classified as a receiver.

11. The computer-implemented method of claim 1, further comprising reclaiming the cache when actual performance for a workload drops below the baseline performance level.

12. The computer-implemented method of claim 1, wherein allocating cache to each workload is based on an allocation policy selected from one of the group consisting of:
a maximum system performance policy; and
a maximum beneficiary policy.

13. A system comprising:
multiple performance tables, each corresponding to a different workload phase to indicate performance as indicated in instructions-per-cycle for various number of cache ways;
a monitor engine to:
monitor cache usage for multiple workloads on a multi-tenant processing infrastructure to determine a workload phase; and
collect statistics per workload, the statistics comprising:
total L1 references of all cores assigned to the workload;
total LLC references for all cores assigned to the workload;
total LLC cache misses by the workload; and
a size of the LLC cache consumed by the workload;
a baseline engine to determine, from a performance table specific to the workload phase, a baseline performance level per workload, which baseline performance level is dependent upon the workload phase;
a categorize engine to categorize workloads of each tenant based on:
cache utilization;
collected statistics; and
extracted information from the performance table whether performance for the workload would increase for the workload phase were more cache available; and
an allocate engine to allocate cache to each workload based on the baseline performance level, cache utilization, and service level agreements.

14. The system of claim 13, wherein the cache is last level cache (LLC).

15. The system of claim 13, wherein the allocate engine allocates cache that is selected from the group consisting of underutilized cache and cache that is not utilized.

16. The system of claim 13, wherein a number of cache ways that are allocated is based on a number of cache reference misses.

17. The system of claim 13, wherein the baseline performance level is based on a number of cores allocated to a workload.

18. The system of claim 13, wherein the system further comprises a performance table that indicates a performance history for cache at a particular phase and different cache levels.

19. A computer program product for dynamically allocating cache, the computer program product comprising a computer readable storage medium having program instructions embodied therewith, the program instructions executable by a processor to cause the processor to:
monitor, by the processor, memory accesses per instructions for multiple workloads on a multi-tenant processing infrastructure;
collect statistics per workload, the statistics comprising:
total L1 references of all cores assigned to the workload;
total LLC references for all cores assigned to the workload;
total LLC cache misses by the workload; and
a size of the LLC cache consumed by the workload;
determine, by the processor, based on the memory accesses per instruction, a workload phase;
determine, by the processor and from a performance table specific to the workload phase, a baseline performance level per workload, which baseline performance level is dependent upon the workload phase;
categorize, by the processor, workloads of each tenant based on:
cache utilization;
collected statistics; and
extracted information from the performance table whether performance for the workload, as indicated in instructions-per-cycle, would increase for the workload phase were more cache available; and
allocate, by the processor, last level cache of multiple levels of cache, to each workload based on the baseline performance level, cache utilization, and system wide cache capacity.

20. The computer program product of claim 19, wherein the program instructions are provided as a service in a cloud environment.

* * * * *